United States Patent [19]

Hsieh

[11] Patent Number: 4,749,539

[45] Date of Patent: Jun. 7, 1988

[54] PROCESS FOR PRODUCING CORROSION RESISTANT SILICON NITRIDE BODIES CONTAINING LA$_2$O$_3$

[75] Inventor: Martin Y. Hsieh, Palto Alto, Calif.

[73] Assignee: GTE Products Corporation, Stamford, Conn.

[21] Appl. No.: 614,896

[22] Filed: May 29, 1984

[51] Int. Cl.$^4$ .............................................. C04B 35/60
[52] U.S. Cl. ..................................... 264/332; 264/65; 501/97
[58] Field of Search ...................... 501/97, 98; 264/65, 264/332

[56] References Cited

U.S. PATENT DOCUMENTS

| 4,097,293 | 6/1978 | Komeya et al. | 501/87 |
| 4,143,107 | 3/1979 | Ishii et al. | 264/65 |
| 4,351,787 | 9/1982 | Martinengo et al. | 264/65 |

FOREIGN PATENT DOCUMENTS

| 0035777 | 9/1981 | European Pat. Off. | 501/87 |
| 0010462 | 3/1977 | Japan | 501/97 |
| 0057100 | 5/1977 | Japan | 501/97 |
| 0116671 | 9/1980 | Japan | 501/97 |

*Primary Examiner*—John F. Niebling
*Attorney, Agent, or Firm*—Donald R. Castle

[57] ABSTRACT

A process is disclosed for producing corrosion resistant silicon nitride bodies from compositions of pure silicon nitride, lanthanum oxide with and without aluminum oxide by hot pressing.

3 Claims, No Drawings

PROCESS FOR PRODUCING CORROSION RESISTANT SILICON NITRIDE BODIES CONTAINING LA₂O₃

BACKGROUND OF THE INVENTION

This invention relates to a process for producing corrosion resistant silicon nitride bodies. More particularly, it provides a silicon nitride composition from which corrosion resistant silicon nitride bodies can be produced.

In general, silicon nitride by itself has limited usage. In order to produce materials for turbines, cutting tools, wear parts and the like, composites are needed which can be pressed to give bodies with special properties such as corrosion resistance. Presently yttrium oxide and aluminum oxide are used with silicon nitride to produce bodies which are resistant to corrosion.

This invention involves the use of lanthanum oxide with or without aluminum oxide with silicon nitride as a composition which when hot pressed produces a body having better corrosion resistance than that which is produced by the yttrium oxide-aluminum oxide-silicon nitride material.

SUMMARY OF THE INVENTION

In accordance with one aspect of this invention, there is provided a process whereby an admixture of silicon nitride and additives is formed and then hot pressed to form a silicon nitride body which has a relatively high corrosion resistance.

In accordance with another aspect of this invention, there is provided a silicon nitride body consisting essentially of in percent by weight, from about 3% to about 10% aluminum oxide and the calance silicon nitride, having a purity of at least about 99.9% and a relatively high resistance to mineral acid corrosion.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

The silicon nitride composition produced by the process of this invention consists essentially of silicon nitride and additives as lanthanum oxide, mixtures of lanthanum oxide and aluminum oxide, lanthanum aluminate, and mixtures of lanthanum aluminate and either lanthanum oxide or aluminum oxide. The aforementioned additives serve as densifying agents.

A typical composition consists essentially of, in percent by weight: from about 4% to about 6% lanthanum oxide with from about 4% to about 5% being preferred and the balance silicon nitride.

Another composition consists essentially of, in percent by weight: form about 3% to about 10% of lanthanum oxide, with from about 4% to about 6% being preferred, and from about 0% to about 4% aluminum oxide, with from about 0.5% to about 2% being preferred, and the balance silicon nitride.

When a lanthanum oxide and aluminum oxide mixture is used as the sintering aid it consists essentially of, in percent by weight: from about 10% to about 90% lanthanum oxide with from about 70% to about 88% being preferred and the balance aluminum oxide. That mixture is then added to silicon nitride to achieve a composition consisting essentially of from about 4% to about 10% of the foregoing sintering aid, balance silicon nitride.

Still another composition consists essentially of in percent by weight: from about 4% to about b 6% lanthanum aluminate with from about 4% to about 5% being preferred and the balance silicon nitride.

Lanthanum aluminate is preferred over lanthanum oxide because the latter is hydroscopic. A procedure for forming lanthanum aluminate is set forth in U.S. patent application Ser. No. 631,270, filed July 17, 1984 and assigned to the same assignee as this application. This process of pre-reacting the oxides of aluminum and lanthanum has processing advantages such as prevention or reduction of the segregation of the lanthanum oxide and aluminum oxide in a silicon nitride composition used for slip casting or tape casting. Pre-reacting the oxides of lanthanum and aluminum, thus increasing the reaction kinetics of the sintering process.

The oxide of lanthanum used in this invention can be any oxide of lanthanum. A lanthanum oxide sold by Molycorp, a subsidiary of Union Oil of California, under the trade name of Molycorp 5200 is suitable. The oxide of aluminum used in this invention can be any oxide of aluminum. A suitable aluminum oxide is sold by Baikowski International Corporation under the trade name of CR-30. The admixture of lanthanum and aluminum oxides is formed by any conventional method such as ball milling, blending and the like which will result in a uniform homogeneous mixture.

As previously mentioned, the process of pre-reacting the oxides of lanthanum and aluminum reduces the potential for segregation of the oxides in certain processes. Therefore, the weight ratio of lanthanum oxide to aluminum oxide can vary from about 1 to 10 to about 10 to 1 and the benefits of this invention can be achieved. When the mole ratio of lanthanum oxide to aluminum oxide is about 1, the compound having the formula $LaAlO_3$ is formed and subsequently utilized in the processes, the potential for segregation is minimized. Generally it is preferred to have 1 mole of lanthanum oxide per mole of aluminum oxide in order to achieve a single phase material. However, even if a single phase material is not obtained, many of the advantages of this invention can be achieved. Therefore, the mole ratio of lanthanum oxide to aluminum oxide can vary from about 1 to 12 to about 12 to 1 or preferably about 1 to 5 to about 5 to 1.

While elevated temperatures, that is above 1500° C. can be used, excessively high temperatures such as above 1700° C. can result in volatilization of the lanthanum oxide. Heating times will vary according to the temperatures, for example, at a temperature of about 1300° C. and a time of about 20 hours only about 65% of the materials are reacted while at about 1450° C. essentially all of the oxides react in about 9 hours. The higher temperatures and longer heating times result in the complete conversation of the lanthanum aluminate. Generally heating temperatures are above about 1000° C.

EXAMPLE

Batches consisting of about 326 parts of Molycorp 5200 lanthanum oxide and about 102 parts of CR-30 aluminum oxide are mixed and heated in order to react to the above materials. The resulting material is analyzed to confirm the presences of lanthanum aluminate. The results of the analyses of the reacted material are given below for each temperature and reaction time.

| Sample # | Heating Temperature °C. | Heating Time Hr. | Phases present |
|---|---|---|---|
| 1 | 1080 | 3 | 35.5% LaAlO$_3$;64.5% La$_2$O$_3$ |
| 2 | 1300 | 20 | 64.5% LaAlO$_3$;35.5% La$_2$O$_3$ |
| 3 | 1430 | 9 | 100% LaAlO$_3$ |
| 4 | 1430 | 20 | 100% LaAlO$_3$ |

It can be seen that the higher heating temperatures and times insure complete conversion to LaAlO$_3$. This reactive material can be mixed with silicon nitride and conventional binders for tape casting and with organic or aqueous mixtures for slip casting.

Generally, the silicon nitride which is used has a purity of at least about 99.9%. A preferred material is supplied by GTE Products Corporation, Chemical and Metallurgical Division under the trade name of SN 502.

The admixture of silicon nitride and the additives is formed by any conventional method such as ball milling, blending, and the like which will result in a uniform homongenous mixture. The admixture is then pressed by conventional methods to form a silicon nitride body. Pressing temperatures are generally from about 1700° C. to about 1800° C. with from about 1710° C. to about 1750° C. being preferred. Pressing pressures are generally from about 3000 psi to about 5000 psi with from about 4000 psi to about 4700 psi being preferred. Pressing times are generally from about 1 hour to about 5 hours with from about 2 hours to about 4 hours being preferred. The resulting silicon nitride body has a high hardness; for example a Rockwell Hardness of greater than about 88% and a relatively high resistance to mineral acid corrosion.

To more fully illustrate this invention, the following non-limiting examples are presented. All parts, portions, and percentages are on a weight basis unless otherwise stated.

EXAMPLES

Parts of silicon nitride are formed from the following compositions with SN 502 silicon nitride, pressed at about 1725° C. for about 2 hours at about 4500 psi, weighed, immersed in boiling acid for about 7 days, and weighed after the immersion period. The degree of corrosion is measured by the weight change of the parts. The results are given below.

| | | Weight Loss Per Surface Area (/gram/cm$^2$) ($\times$ 10$-4$) | | | |
|---|---|---|---|---|---|
| Part # | Composition Balance Si$_3$N$_4$ | 70% HNO$_3$ | 38% HCl | 86% H$_3$PO$_4$ | 20% H$_2$SO$_4$ |
| 1 | 6% La$_2$O$_3$,0% Al$_2$O$_3$ | +0.45(gain) | +5.5(gain) | 5.0(loss) | 1.5(loss) |
| 2 | 6% La$_2$O$_3$,0.5% Al$_2$O$_3$ | 1.03(loss) | 13.3(loss) | 6.1(loss) | 2.0(gain) |
| 3 | 6% La$_2$O$_3$,1% Al$_2$O$_3$ | +0.38(gain) | 0.0(loss) | 8.0(loss) | 0.5(gain) |
| 4 | 6% La$_2$O$_3$,2% Al$_2$O$_3$ | +1.83(gain) | 0.8(loss) | 10.0(loss) | 0.4(gain) |
| 5 | 4% La$_2$O$_3$,0% Al$_2$O$_3$ | Negligible | Negligible | Negligible | Negligible |
| 6 | 4% La$_2$O$_3$,0.05% Al$_2$O$_3$ | Negligible | Negligible | Negligible | Negligible |
| 7 | 5% La$_2$O$_3$,0% Al$_2$O$_3$ | Negligible | Negligible | Negligible | Negligible |

The above corrosion rates exhibit the corrosion resistant properties of the respective parts.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing corrosion resistant silicon nitride bodies, said process comprising:
   (a) forming an admixture consisting essentially of silicon nitride, and additivies selected from the group consisting of lanthanum aluminumate, mixtures of lanthanum aluminate and lanthanum oxide and mixtures of lanthanum aluminate and aluminum oxide and
   (b) pressing said admixture at from about 1700° C. to about 1800° C. and at from about 3,000 psi to about 5000 psi and from about 1 hr to about 5 hrs to form a dense silicon nitride body which is resistant to mineral acid corrosion.

2. A process according to claim 1 wherein the admixture has a composition consisting essentially of, by weight: from about 4% to about 6% lanthanum aluminate and the balance silicon nitride.

3. A process according to claim 1 wherein the silicon nitride has a purity of at least about 99.9%.

* * * * *